(12) United States Patent
Ogawa et al.

(10) Patent No.: US 8,487,558 B2
(45) Date of Patent: Jul. 16, 2013

(54) ELECTRIC VEHICLE

(75) Inventors: Taichi Ogawa, Utsunomiya (JP); Tohru Kuribayashi, Utsunomiya (JP); Arata Ohishi, Utsunomiya (JP); Eiji Agatsuma, Kawachi-gun (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/408,516

(22) Filed: Feb. 29, 2012

(65) Prior Publication Data

US 2012/0229057 A1    Sep. 13, 2012

(30) Foreign Application Priority Data

Mar. 8, 2011    (JP) .................................. 2011-050265

(51) Int. Cl.
| | | |
|---|---|---|
| H02P 1/00 | (2006.01) | |
| H02P 3/18 | (2006.01) | |
| H02P 27/04 | (2006.01) | |
| H02J 7/00 | (2006.01) | |

(52) U.S. Cl.
USPC ........... 318/139; 318/376; 318/801; 320/107; 320/109; 320/110; 320/116

(58) Field of Classification Search
USPC .................. 318/139, 376, 801; 320/107, 109, 320/110, 116
See application file for complete search history.

(56) References Cited

U.S. PATENT DOCUMENTS

| | | | | |
|---|---|---|---|---|
| 5,341,083 A | * | 8/1994 | Klontz et al. .................. | 320/109 |
| 5,596,258 A | * | 1/1997 | Kimura et al. ................. | 320/163 |
| 5,877,601 A | * | 3/1999 | Obara et al. ................... | 318/139 |
| 7,830,117 B2 | * | 11/2010 | Ambrosio et al. ............. | 320/109 |
| 7,950,943 B2 | * | 5/2011 | Ohtomo ......................... | 439/299 |
| 2004/0062059 A1 | * | 4/2004 | Cheng et al. ................... | 363/17 |
| 2009/0315519 A1 | * | 12/2009 | Izumi et al. .................... | 320/134 |
| 2010/0214055 A1 | * | 8/2010 | Fuji et al. ....................... | 340/3.1 |
| 2012/0040224 A1 | * | 2/2012 | Reischmann et al. ......... | 429/120 |
| 2012/0319648 A1 | * | 12/2012 | Ohtomo ......................... | 320/109 |

FOREIGN PATENT DOCUMENTS

| | | |
|---|---|---|
| JP | 2007-28803 | 2/2007 |
| JP | 2008-131769 | 6/2008 |
| JP | 2009-89577 | 4/2009 |
| JP | 2010-259274 | 11/2010 |
| JP | 2010-279159 | 12/2010 |

OTHER PUBLICATIONS

Japanese Office Action for Application No. 2011-050265, 5 pages, dated Jan. 8, 2013.

* cited by examiner

*Primary Examiner* — Bentsu Ro
*Assistant Examiner* — Gabriel Agared
(74) *Attorney, Agent, or Firm* — Nelson Mullins Riley & Scarborough LLP; Anthony A. Laurentano

(57) ABSTRACT

An electric vehicle may include a main battery, a charging system electronic device, an electrically powered system-based electronic device, a first high-voltage electric wire; and a second high-voltage electric wire. The electrically powered system-based electronic device and the charging system electronic device may be sequentially disposed in parallel. The electric vehicle may further include a first junction relay capable of isolating the first high-voltage electric wire; and a second junction relay capable of isolating the second high-voltage electric wire. The first junction relay is disposed between the main battery and the charging system electronic device, and a first pre-charge relay which bypasses the first junction relay is disposed in parallel with the first junction relay, and the second junction relay is disposed between the charging system electronic device and the electrically powered system-based electronic device.

4 Claims, 5 Drawing Sheets

ELECTRIC VEHICLE

BACKGROUND OF THE PRESENT INVENTION

1. Field of the Present Invention

The present invention relates to an electric vehicle which is provided with an electric storage device capable of being charged from an external power supply.

Priority is claimed on Japanese Patent Application No. 2011-050265, filed Mar. 8, 2011, the content of which is incorporated herein by reference.

2. Description of Related Art

All patents, patent applications, patent publications, scientific articles, and the like, which will hereinafter be cited or identified in the present application, will hereby be incorporated by reference in their entirety in order to describe more fully the state of the art to which the present invention pertains.

In the past, as an electric vehicle which drives a motor for travelling by using electric power stored in a main battery, an electric vehicle in which the main battery can be charged by electric power which is supplied from an external power supply has been known. As this type of electric vehicle, for example, there is a case where each of a charging system electronic device such as a battery charger which charges the main battery by using the electric power from the external power supply and an electrically powered system-based electronic device such as an inverter for driving a motor is connected in parallel to the main battery (refer to Japanese Unexamined Patent Application, First Publication No. 2009-89577, for example).

However, in the case of the existing electric vehicle described above, since during charging of the main battery, charging voltage is applied to electrically powered system-based electronic devices such as an inverter, a booster, and high-voltage system auxiliary machines, which do not need to be operated, in addition to a travelling time of the vehicle, for a period of time corresponding to a charging time, voltage continues to be unnecessarily applied to circuits on the main battery side of the electrically powered system-based electronic devices. For this reason, there is concern that the capacitor loads for smoothing or the like which are provided in the circuits on the main battery side of the electrically powered system-based electronic devices may increase.

SUMMARY

The present invention provides an electric vehicle in which it is possible to attain a reduction in the load of an electrically powered system-based electronic device which is applied at the time of charging to a main battery, while suppressing an increase in the number of components.

An electric vehicle may include: a main battery; a charging system electronic device configured to charge a vehicle-mounted electric power supply that includes the main battery; an electrically powered system-based electronic device including an inverter configured to convert direct-current power of the main battery into alternating-current power, thereby driving a motor for travelling; a first high-voltage electric wire that connects the charging system electronic device and the electrically powered system-based electronic device to any one of the positive electrode side and the negative electrode side of the main battery; and a second high-voltage electric wire that connects the charging system electronic device and the electrically powered system-based electronic device to the other one of the positive electrode side and the negative electrode side of the main battery. The electrically powered system-based electronic device and the charging system electronic device may be sequentially disposed in parallel. The electric vehicle may further include: a first junction relay capable of isolating the first high-voltage electric wire; and a second junction relay capable of isolating the second high-voltage electric wire. The first junction relay may be disposed between the main battery and the charging system electronic device. A first pre-charge relay that bypasses the first junction relay may be disposed in parallel with the first junction relay, and the second junction relay may be disposed between the charging system electronic device and the electrically powered system-based electronic device.

Preferably, when performing charging using the charging system electronic device, starting from a state where all of the first pre-charge relay, the first junction relay, and the second junction relay are opened, the first pre-charge relay is made to be in a closed state while maintaining the opened state of the second junction relay, and thereafter, the first junction relay is switched to a closed state. When starting up the electrically powered system-based electronic device, starting from a state where the first pre-charge relay, the first junction relay, and the second junction relay are opened, the second junction relay is switched to a closed state, while the first pre-charge relay is made to be in a closed state and thereafter, the first junction relay is switched to a closed state.

Preferably, a second pre-charge relay that bypasses the second junction relay is disposed in parallel with the second junction relay.

Preferably, when performing charging using the charging system electronic device, starting from a state where the first pre-charge relay, the first junction relay, and the second junction relay are opened, the first pre-charge relay is made to be in a closed state while maintaining the opened state of the second junction relay, and thereafter, the first junction relay is switched to a closed state. When starting up the electrically powered system-based electronic device, starting from a state where the first pre-charge relay, the second pre-charge relay, the first junction relay, and the second junction relay are opened, the second pre-charge relay is made to be in a closed state, and then the second junction relay is switched to a closed state, and then each potential of smoothing capacitors that are provided in the charging system electronic device and the electrically powered system-based electronic device is raised to a given potential, and then the first pre-charge relay is made to be in a closed state, and thereafter, the first junction relay is switched to a closed state.

According to an aspect of the present invention, a first pre-charge relay provided in parallel with a first junction relay is disposed between a main battery and a charging system electronic device and a second junction relay is disposed between the charging system electronic device and an electrically powered system-based electronic device, whereby, when the main battery is being charged by the charging system electronic device, it becomes possible to disconnect the charging system electronic device and the electrically powered system-based electronic device from each other by the second junction relay, so that it is possible to prevent application of voltage to the electrically powered system-based electronic device at the time of charging of the main battery.

Therefore, it becomes possible to attain a reduction in the load of the electrically powered system-based electronic device which is applied at the time of charging to the main battery, without an increase in the number of components.

According to an aspect of the present invention, when starting charging using the charging system electronic device, by the first pre-charge relay being in a closed state before the first junction relay is closed, it is possible to suppress an inrush current to capacitors which are located on the main battery side of the charging system electronic device, and when starting up the electrically powered system-based electronic device after charging using the charging system electronic device is performed, by the first pre-charge relay being in a closed state after the second junction relay is switched to a closed state, it is possible to suppress an inrush current to capacitors which are located on the main battery side of the electrically powered system-based electronic device.

Therefore, as well as reducing the loads on the capacitors which are located on the main battery side of the charging system electronic device and loads on the capacitors provided on the main battery side of the electrically powered system-based electronic device, it is also possible to prevent deterioration of a junction of the first junction relay, so that it is possible to attain longer service life of the first junction relay and the capacitors without using a high-performance junction relay or capacitors in which current withstand or withstand voltage is large.

According to an aspect of the present invention, in the case of starting up the electrically powered system-based electronic device after the main battery is charged by the charging system electronic device, even if a potential difference occurs in the capacitors which are located on the main battery side of the electrically powered system-based electronic device and the capacitors which are located on the main battery side of the charging system electronic device, since by the second pre-charge relay being in a closed state before the second junction relay is made to be in a closed state, an electric current slowly flows from the capacitors of the charging system electronic device to the capacitors of the electrically powered system-based electronic device, so that the potential of each capacitor is averaged, it is possible to prevent an inrush current which flows between the capacitors when the second junction relay is made to be in a closed state. Therefore, it is possible to prevent deterioration of a junction of the second junction relay and it also becomes possible to reduce the loads of the capacitors, thereby further extending service life.

BRIEF DESCRIPTION OF THE DRAWINGS

The above features and advantages of the present invention will be more apparent from the following description of certain preferred embodiments taken in conjunction with the accompanying drawings, in which.

DETAILED DESCRIPTION OF THE PRESENT INVENTION

Figure 1:
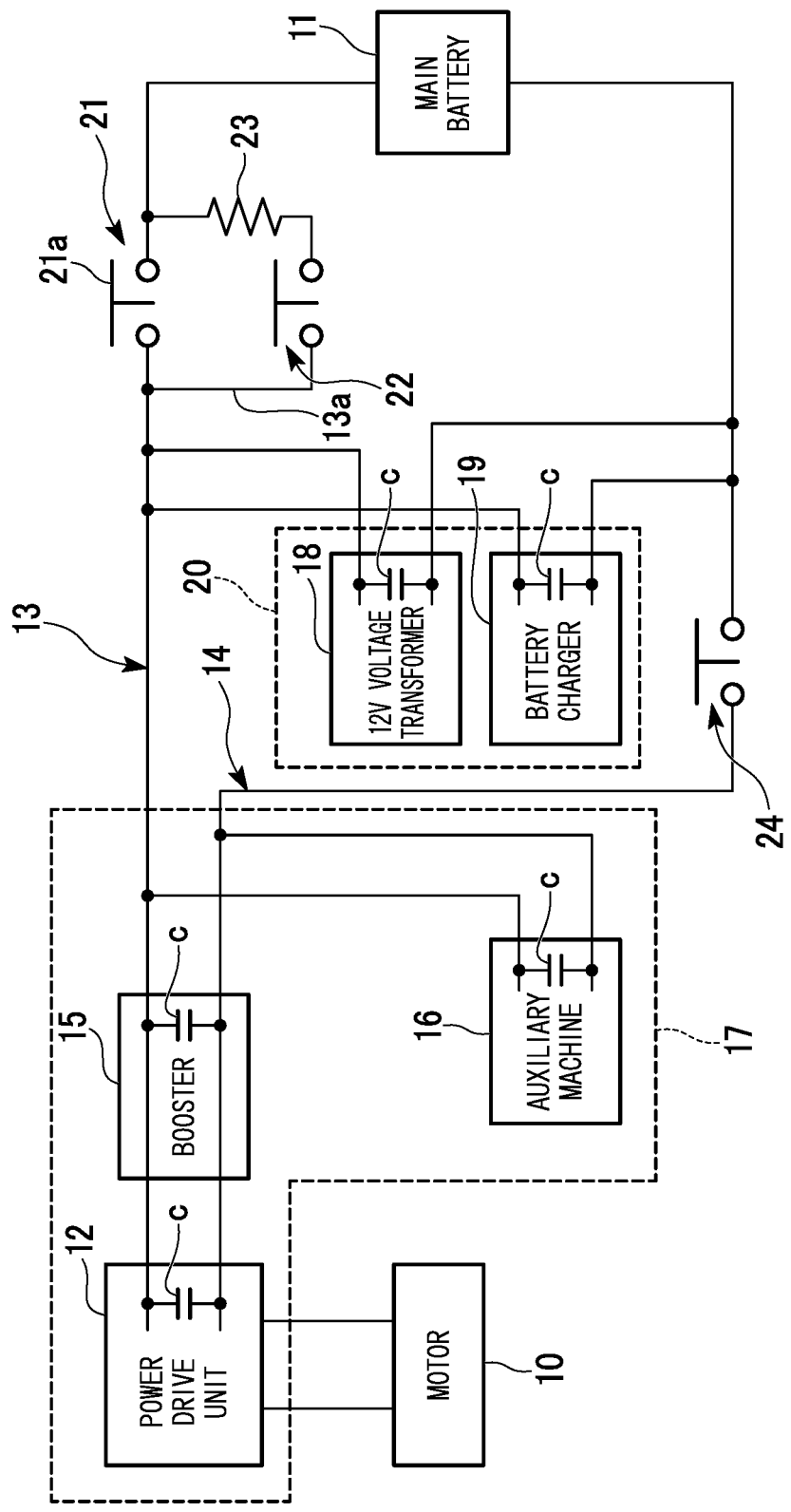
FIG. 1 is a circuit diagram illustrating a schematic configuration of an electric vehicle in accordance with a first preferred embodiment of the present invention.

Next, a charging system of an electric vehicle in accordance with preferred embodiments of the present invention will be described referring to the drawings.

FIG. 1 is a circuit diagram illustrating a schematic configuration of an electric vehicle in accordance with a first preferred embodiment of the present invention. FIG. 1 shows an electric car 100 that is the electric vehicle in accordance with the first preferred embodiment, and the electric car 100 is provided with a motor for travelling 10 such as a DC brushless motor, a drive shaft which is connected to drive wheels through a gear box or the like (none of which is shown), and a main battery 11 which supplies electric power to the motor for travelling 10, and application of an electric current to the motor for travelling 10 is controlled by a power drive unit 12. Here, the main battery 11 is a so-called high-voltage battery, the output voltage of which is higher than battery voltage (for example, 12 V) for various auxiliary machines.

The power drive unit 12 is for converting the direct-current power of the main battery 11 into alternating-current power, thereby driving the motor for travelling 10, and is configured to include a PWM inverter (not shown) by pulse width modulation (PWM) of a bridge circuit composed of a plurality of switching devices (not shown) such as IGBTs bridge-connected to each other. The power drive unit 12 receives a control command from a motor control device (not shown), thereby controlling driving of the motor for travelling 10. In addition, in addition to driving the above-described motor for travelling 10 by the electric power from the main battery 11, a configuration may also be made such that electric power which is output from the motor for travelling 10 at the time of electric power generation by a regeneration operation can be charged to the main battery 11.

The power drive unit 12 is connected to the positive electrode side of the main battery 11 through a high-voltage electric wire 13 and to the negative electrode side of the main battery 11 through a high-voltage electric wire 14. To the high-voltage electric wire 13 and the high-voltage electric wire 14 between the power drive unit 12 and the main battery 11, a booster 15 is connected in series and an auxiliary machine 16 is branch-connected.

The booster 15 is provided with a circuit which boosts voltage that is applied to the main battery 11 side, up to the voltage required for driving of the motor for travelling 10, and outputs the boosted voltage to the power drive unit 12, by switching by a switch device (not shown), for example.

The auxiliary machine 16 is a load such as an inverter of a car air-conditioner and is connected further to the main battery 11 side than the booster 15. In addition, in the electric car 100 in accordance with the first preferred embodiment, an electrically powered system-based electronic device 17 which drives the motor for travelling 10, the inverter of the car air-conditioner, or the like is constituted by the power drive unit 12, the booster 15, and the auxiliary machine 16.

Each of a 12 V voltage transformer 18 and a battery charger 19 is branch-connected further to the main battery 11 side than the electrically powered system-based electronic device 17.

The 12 V voltage transformer 18 is provided with a circuit which steps down and outputs the output voltage of the main battery 11 in order to charge a battery (not shown) of a low-voltage system (for example, 12 V) lower than the voltage of the main battery 11 or drive a load (not shown) of a low-voltage system.

The battery charger 19 is provided with a circuit which charges the main battery 11 by electric power that is supplied from a fast charging facility provided at the outside of a vehicle such as a parking lot. For example, a power receiving connector, to which a power feeding connector provided at the charging facility can be electrically connected, is provided in the electric car 100, and the power receiving connector and the power feeding connector are connected to each other, whereby electric power can be supplied from the fast charging facility to the electric car 100. In addition, in the electric car 100 in accordance with the first preferred embodiment, a charging system electronic device 20 which charges the main battery 11 and the battery of a low-voltage system is constituted by the 12 V voltage transformer 18 and the battery charger 19, and the above-described electrically powered system-based electronic device 17 and the charging system electronic device 20 are sequentially disposed in parallel with respect to the main battery 11.

In the high-voltage electric wire 13, a first junction relay 21 is interposed between the charging system electronic device 20 and the main battery 11. The first junction relay 21 opens (OFF) or closes (ON) a junction 21a thereof based on a control command of a control device (not shown), thereby performing electrical connection or isolation of the high-voltage electric wire 13. Further, a bypass electric wire 13a which bypasses the first junction relay 21 is connected to the high-voltage electric wire 13, and a first pre-charge relay 22 and a pre-charge resistor 23 are interposed in series in the bypass electric wire 13a. The first pre-charge relay 22 opens or closes a junction 22a based on a control command of the control device, thereby performing electrical connection or isolation of the bypass electric wire 13a.

In the high-voltage electric wire 14, a second junction relay 24 is interposed between the electrically powered system-based electronic device 17 and the charging system electronic device 20. The second junction relay 24 opens or closes a junction 24a based on a control command of the control device, similarly to the above-described first junction relay 21, thereby performing electrical connection or isolation of the high-voltage electric wire 14.

In a power input circuit on the main battery 11 side of each device of the electrically powered system-based electronic device 17 and the charging system electronic device 20 described above, a circuit having a capacitive element such as a capacitor c for rectification is provided.

The electric car 100 in accordance with the first preferred embodiment has the above-described configuration, and next, an operation of the electric car 100, more specifically, an operation when charging the main battery 11 and an operation when starting up the electrically powered system-based electronic device 17 will be described separately. In addition, each of the first junction relay 21, the first pre-charge relay 22, and the second junction relay 24 is set to be in an opened state in the initial state and the capacitors c are set not to be charged.

First, when charging the main battery 11, the first pre-charge relay 22 is closed. Then, an electric current from the main battery 11 flows into the capacitors c of the 12 V voltage transformer 18 and the battery charger 19 of the charging system electronic device 20 through the pre-charge resistor 23. Since the electric current flows through the pre-charge resistor 23, an inrush current is suppressed. Subsequently, at the time when the capacitors c have been sufficiently charged, the first junction relay 21 is closed. By the closing of the first junction relay 21, charging of the main battery 11 by the battery charger 19 can be started. Here, if it is determined that charging of the main battery 11 by the battery charger 19 is finished, the first junction relay 21 is opened. The completion of charging is determined based on the detection result of a current sensor (not shown) mounted on the high-voltage electric wire 13 or the high-voltage electric wire 14, a voltage sensor which measures the inter-terminal voltage of the main battery 11, or the like. In addition, the first pre-charge relay 22 may also be opened at the time when the first junction relay 21 is closed.

On the other hand, when starting up the electrically powered system-based electronic device 17, first, the second junction relay 24 is closed. Subsequently, the first pre-charge relay 22 is closed, whereby the capacitor c provided in each device of the electrically powered system-based electronic device 17 and the charging system electronic device 20 is charged. In this way, each capacitor c of the electrically powered system-based electronic device 17 and the charging system electronic device 20 is charged and also the terminal voltage thereof is averaged. Then, finally, if the first junction relay 21 is closed, a state is created where the electric power of the main battery 11 is supplied to the electrically powered system-based electronic device 17.

Therefore, according to the electric car 100 in accordance with the first preferred embodiment described above, the first pre-charge relay 22 connected in parallel to the first junction relay 21 is disposed between the main battery 11 and the charging system electronic device 20 and the second junction relay 24 is disposed between the charging system electronic device 20 and the electrically powered system-based electronic device 17, whereby, when the main battery 11 is being charged by the charging system electronic device 20, the charging system electronic device 20 and the electrically powered system-based electronic device 17 can be disconnected from each other by the second junction relay 24, so that it is possible to prevent an application of voltage to the electrically powered system-based electronic device 17 at the time of charging of the main battery 11, and as a result, it becomes possible to attain a reduction in the load of the electrically powered system-based electronic device 17 which is applied at the time of charging to the main battery 11, without an increase in the number of components.

Further, when starting charging using the charging system electronic device 20, by the first pre-charge relay 22 being in a closed state before the first junction relay 21 is closed, it is possible to suppress an inrush current to the capacitors c which are located on the main battery 11 side of the charging system electronic device 20, and when starting up the electrically powered system-based electronic device 17 after charging using the charging system electronic device 20 is performed, by the first pre-charge relay 22 being in a closed state after the second junction relay 24 is switched to a closed state, it is possible to suppress an inrush current to the capacitors c which are located on the main battery 11 side of the electrically powered system-based electronic device 17, so that loads on the capacitors c provided on the main battery 11 side of the charging system electronic device 20 and loads on the capacitors c which are located on the main battery 11 side of the electrically powered system-based electronic device 17 can be reduced, and as a result, it is possible to attain longer service life of the capacitors c without using high-performance capacitors c.

Next, an electric car 200 that is an electric vehicle in accordance with a second preferred embodiment of the present invention will be described referring to the drawings. In addition, since the electric car 200 in accordance with the second preferred embodiment has a configuration in which a pre-charge circuit which bypasses the second junction relay 24 of the electric car 100 in accordance with the first preferred embodiment described above is additionally provided, the electric car 200 will be described with the same section denoted by the same reference numeral.

Figure 2:
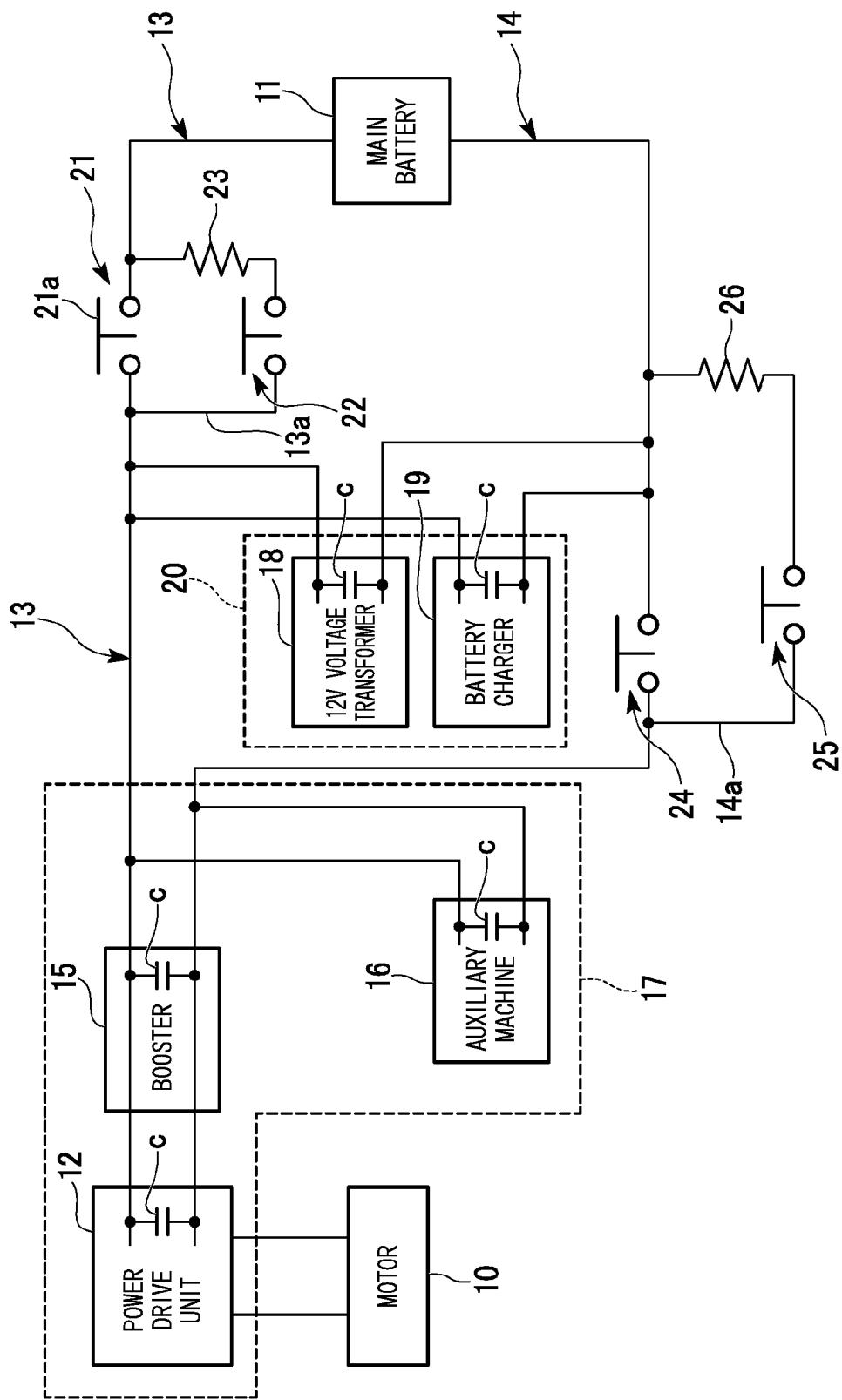
FIG. 2 is a circuit diagram equivalent to FIG. 1 in accordance with a second preferred embodiment of the present invention.

FIG. 2 is a circuit diagram equivalent to FIG. 1 in accordance with the second preferred embodiment of the present invention. As shown in FIG. 2, in the electric car 200 in accordance with the second preferred embodiment, the second junction relay 24 is interposed between the electrically powered system-based electronic device 17 and the charging system electronic device 20 in the high-voltage electric wire 14. Further, a bypass electric wire 14a which bypasses the second junction relay 24 is connected to the high-voltage electric wire 14, and a second pre-charge relay 25 and a pre-charge resistor 26 are interposed in series in the bypass electric wire 14a. In addition, since other configurations are similar to those in the first preferred embodiment described above, detailed explanation will be omitted.

Next, an operation of the above-described electric car 200, in particular, an operation when charging the main battery 11 and an operation when starting up the electrically powered system-based electronic device 17 will be described referring to flowcharts.

Figure 3:
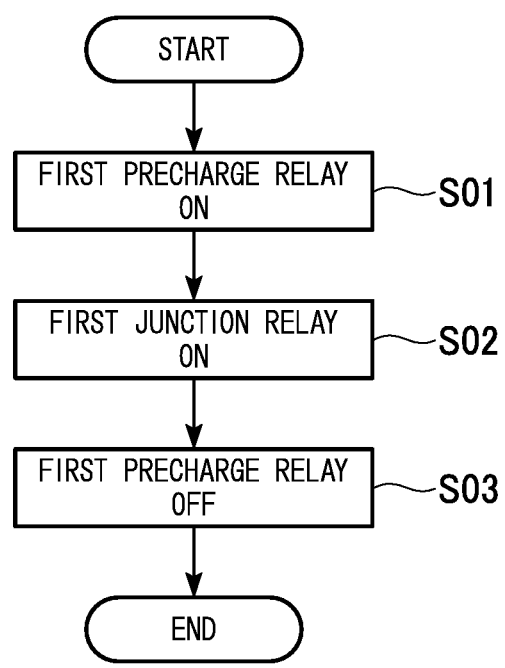
FIG. 3 is a flowchart illustrating an operation when charging a main battery in accordance with the second preferred embodiment of the present invention.
Figure 4:
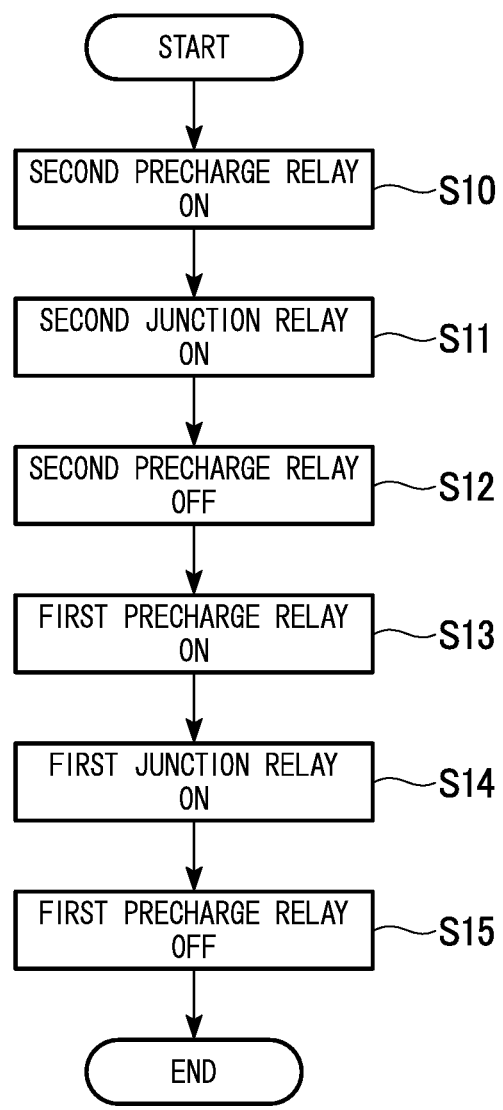
FIG. 4 is a flowchart illustrating an operation when starting up an electrically powered system-based electronic device 17 in accordance with the second preferred embodiment of the present invention.

FIG. 3 is a flowchart illustrating an operation when charging the main battery in accordance with the second preferred embodiment of the present invention. FIG. 4 is a flowchart illustrating an operation when starting up the electrically powered system-based electronic device 17 in accordance with the second preferred embodiment of the present invention.

First, as shown in FIG. 3, when starting charging, starting from a state where the first junction relay 21, the first pre-charge relay 22, the second junction relay 24, and the second pre-charge relay 25 are opened, only the first pre-charge relay 22 is closed (Step S01), so that charging (pre-charge) to the capacitors c of the charging system electronic device 20 is performed through the pre-charge resistor 23. At this time, in the second pre-charge relay 25, the opened state is maintained.

Subsequently, the first junction relay 21 is closed (Step S02) and the first pre-charge relay 22 is closed (Step S03). In this way, the battery charger 19 is connected to the positive electrode side and the negative electrode side of the main battery 11 through the high-voltage electric wire 13 and the high-voltage electric wire 14.

Next, as shown in FIG. 4, when starting up the electrically powered system-based electronic device 17, starting from a state where the first junction relay 21, the first pre-charge relay 22, the second junction relay 24, and the second pre-charge relay 25 are opened (OFF), only the second pre-charge relay 25 is closed (ON) (Step S10).

In this way, for example, in a case just after charging of the main battery 11, movement (pre-charge) of electrical charges from each capacitor c of the charging system electronic device 20, where the amount of charge is large, to each capacitor c of the electrically powered system-based electronic device 17, where the amount of charge is relatively small, is performed through the pre-charge resistor 26, and as a result, the terminal voltages (electric potentials) of each capacitor c of the charging system electronic device 20 and each capacitor c of the electrically powered system-based electronic device 17 are averaged. In addition, the completion of averaging of the terminal voltage of each capacitor c can be determined by an elapsed time or the like.

Then, if the terminal voltage of each capacitor c of the charging system electronic device 20 and the electrically powered system-based electronic device 17 is averaged, the second junction relay 24 is closed (ON) (Step S11) and the second pre-charge relay 25 is opened (OFF) (Step S12).

Thereafter, in order for the electric power from the main battery 11 to be able to be supplied to the electrically powered system-based electronic device 17 and the charging system electronic device 20 (in particular, the 12 V voltage transformer), the first pre-charge relay 22 is closed (ON) (Step S13), so that charging (pre-charge) to each capacitor c of the electrically powered system-based electronic device 17 and the charging system electronic device 20 is performed. If the charging to each capacitor c of the electrically powered system-based electronic device 17 and the charging system electronic device 20 is finished, the first junction relay 21 is closed (ON) (Step S14) and the first pre-charge relay 22 is opened (OFF) (Step S15). In this way, both the first junction relay 21 and the second junction relay 24 are closed (ON), so that the electric power of the main battery 11 is supplied to the electrically powered system-based electronic device 17 and the charging system electronic device 20.

Therefore, according to the second preferred embodiment described above, in the case of starting up the electrically powered system-based electronic device 17 after the main battery 11 is charged by the charging system electronic device 20, even if a potential difference occurs in the capacitors c which are located on the main battery 11 side of the electrically powered system-based electronic device 17 and the capacitors c which are located on the main battery 11 side of the charging system electronic device 20, since by the second pre-charge relay 25 being in a closed state before the second junction relay is in a closed state, an electric current slowly flows from the capacitors c of the charging system electronic device 20 to the capacitors c of the electrically powered system-based electronic device 17 through the pre-charge resistor 26, so that the potential of each capacitor c is averaged, it is possible to prevent an inrush current which flows between the capacitors c when the second junction relay 24 is made to be in a closed state, and as a result, it is possible to prevent deterioration of the junction of the second junction relay 24 and it becomes also possible to reduce the loads of the capacitors c, thereby further extending service life.

Figure 5:
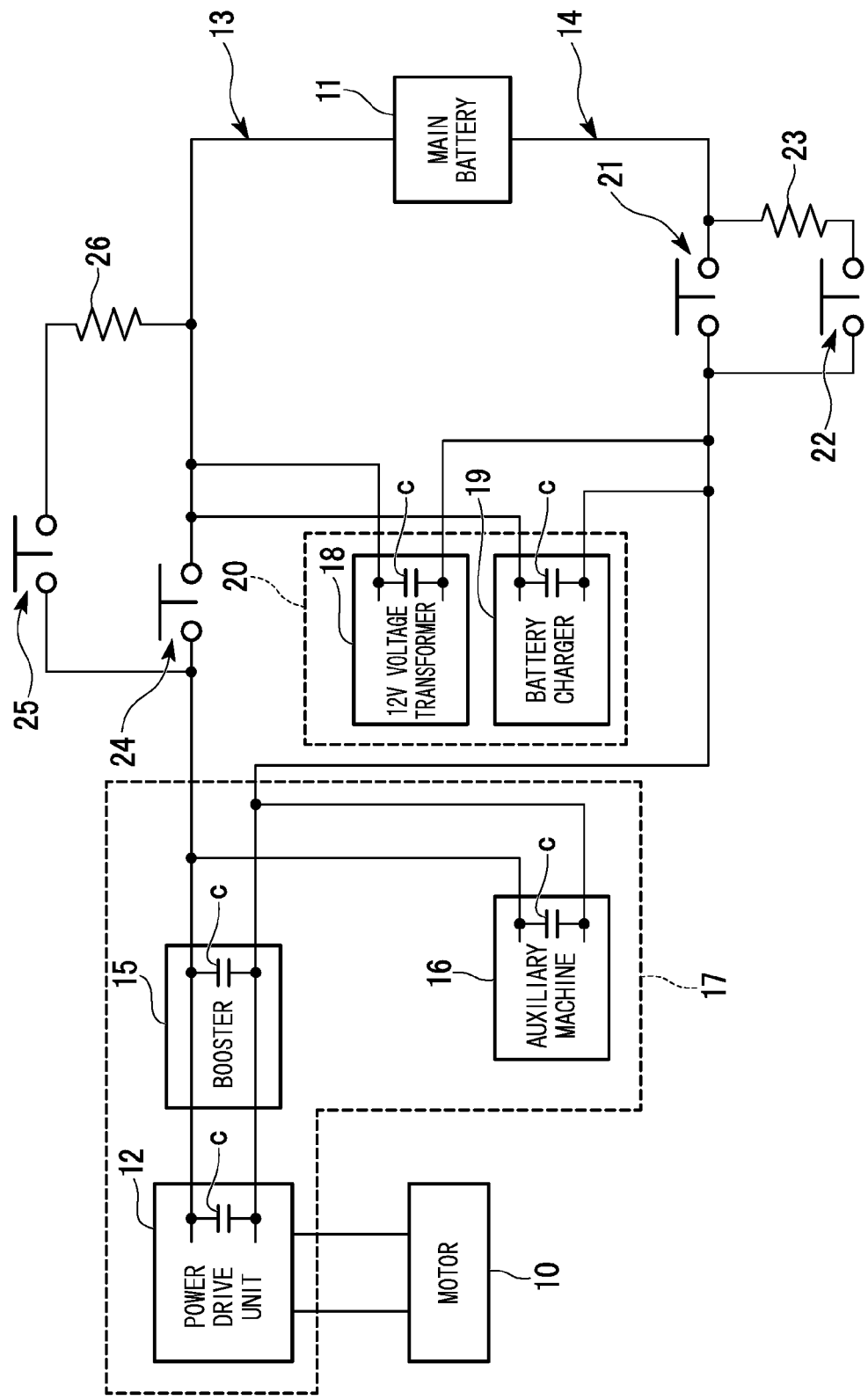
FIG. 5 is a circuit diagram equivalent to FIG. 1 in a modified example in accordance with the preferred embodiment of the present invention.

For example, in each preferred embodiment described above, a case has been described where the first junction relay 21 and the first pre-charge relay 22 are provided between the main battery 11 and the charging system electronic device 20 in the high-voltage electric wire 13 which is connected to the positive electrode side of the main battery 11 and on the other hand, the second junction relay 24 is provided between the charging system electronic device 20 and the electrically powered system-based electronic device 17 in the high-voltage electric wire 14 which is connected to the negative electrode side of the main battery 11. However, the present invention is not limited to this configuration. FIG. 5 is a circuit diagram equivalent to FIG. 1 in a modified example in accordance with the preferred embodiment of the present invention. For example, circuit polarity may also be switched as in the modified example shown in FIG. 5. That is, a configuration may also be made such that the second junction relay 24 is disposed between the charging system electronic device 20 and the electrically powered system-based electronic device 17 in the high-voltage electric wire 13 which is connected to the positive electrode side of the main battery 11 and the first junction relay 21 is disposed between the charging system electronic device 20 and the main battery 11 in the high-voltage electric wire 14 which is connected to the negative electrode side of the main battery 11.

While preferred embodiments of the present invention have been described and illustrated above, it should be understood that these are exemplary of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the appended claims.

What is claimed is:

1. An electric vehicle comprising:
a main battery;
a charging system electronic device configured to charge a vehicle-mounted electric power supply that includes the main battery;
an electrically powered system-based electronic device including an inverter configured to convert direct-current power of the main battery into alternating-current power, thereby driving a motor for travelling;
a first high-voltage electric wire that connects the charging system electronic device and the electrically powered system-based electronic device to any one of the positive electrode side and the negative electrode side of the main battery; and
a second high-voltage electric wire that connects the charging system electronic device and the electrically powered system-based electronic device to the other one of the positive electrode side and the negative electrode side of the main battery,
characterized by
the electrically powered system-based electronic device and the charging system electronic device are sequentially disposed in parallel,
the electric vehicle further comprises:
a first junction relay capable of isolating the first high-voltage electric wire; and
a second junction relay capable of isolating the second high-voltage electric wire,
the first junction relay is disposed between the main battery and the charging system electronic device, and
a first pre-charge relay that bypasses the first junction relay is disposed in parallel with the first junction relay, and the second junction relay is disposed between the charging system electronic device and the electrically powered system-based electronic device.

2. The electric vehicle according to claim 1, wherein
when performing charging using the charging system electronic device, starting from a state where all of the first pre-charge relay, the first junction relay, and the second junction relay are opened, the first pre-charge relay is made to be in a closed state while maintaining the opened state of the second junction relay, and thereafter, the first junction relay is switched to a closed state, and
when starting up the electrically powered system-based electronic device, starting from a state where the first pre-charge relay, the first junction relay, and the second junction relay are opened, the second junction relay is switched to a closed state, while the first pre-charge relay is made to be in a closed state and thereafter, the first junction relay is switched to a closed state.

3. The electric vehicle according to claim 1, wherein a second pre-charge relay that bypasses the second junction relay is disposed in parallel with the second junction relay.

4. The electric vehicle according to claim 3, wherein
when performing charging using the charging system electronic device, starting from a state where the first pre-charge relay, the first junction relay, and the second junction relay are opened, the first pre-charge relay is made to be in a closed state while maintaining the opened state of the second junction relay, and thereafter, the first junction relay is switched to a closed state, and
when starting up the electrically powered system-based electronic device, starting from a state where the first pre-charge relay, the second pre-charge relay, the first junction relay, and the second junction relay are opened, the second pre-charge relay is made to be in a closed state, and then the second junction relay is switched to a closed state, and then each potential of smoothing capacitors that are provided in the charging system electronic device and the electrically powered system-based electronic device is raised to a given potential, and then the first pre-charge relay is made to be in a closed state, and thereafter, the first junction relay is switched to a closed state.

* * * * *